United States Patent [19]

Rose

[11] 3,853,358
[45] Dec. 10, 1974

[54] SLIDE RAIL

[75] Inventor: Jack H. Rose, Livonia, Mich.

[73] Assignee: Massey-Ferguson Inc., Detroit, Mich.

[22] Filed: June 11, 1973

[21] Appl. No.: 368,551

[52] U.S. Cl. .................................. 305/24, 305/28
[51] Int. Cl. ............................................. B62d 55/08
[58] Field of Search .................... 305/24, 25, 27, 28

[56] References Cited
UNITED STATES PATENTS

| | | | |
|---|---|---|---|
| 2,393,993 | 2/1946 | Knox | 305/27 |
| 3,637,265 | 1/1972 | Valentine | 305/24 |
| 3,761,143 | 9/1973 | Russ | 305/28 |

Primary Examiner—Philip Goodman
Attorney, Agent, or Firm—Thomas P. Lewandowski

[57] ABSTRACT

A flexible quickly removable rail as disclosed in one embodiment for use on a snowmobile wherein a rail is located centrally of an inclined section of a continuous track member for driving the snowmobile and is attached to the suspension means of the snowmobile in a manner to allow the slide rail to slide in the longitudinal direction providing for further flexibility of the rail. The rail is spaced from the track under normal conditions to enable it to selectively engage the inclined portion of the track whenever the inclined portion encounters terrain, and particularly loose terrain, to enable the rail to stiffen the inclined portion of the track and thereby pack the loose terrain over which the remainder of the belt may then travel.

11 Claims, 3 Drawing Figures

PATENTED DEC 10 1974  3,853,358

SLIDE RAIL

Two common suspension means for track vehicles such as snowmobiles are slide rails and bogey wheels located on the lower section of the track for maintaining the track in flat engagement with the terrain. The slide rail suspension due to its ability to pack the terrain beneath the track is known for its ability to allow the vehicle to climb hills. When moving through snow, the snow lubricates the slide rail to prevent overheating of the track. The bogey wheel suspension does not require the lubrication from the snow because there is no slippage between the bogey wheels and the track where the wheels turn in unison with the motion of the track. However, the bogey wheels do not have the packing characteristic associated with the slide rails which makes them particularly suitable for purposes of hill climbing.

The present invention overcomes the above problems with a slide rail which may be quickly attached as an auxiliary feature to most tracked vehicles to enhance the ability of the track to pack the terrain over which it travels without the associated problem of friction on the track when the rail support is not required because there is no load on the track section supported by the rail.

The present slide rail relates to track vehicles in general and more particularly to support for tracks on snowmobiles providing a method of compacting the surface of terrain over which the snowmobile passes wherein a forward inclined section of a continuous track is provided with selective support for the inclined section of the track along the length thereof, and supporting the section of track whenever the section of track is contacted by loose terrain to cause the section of track to compact the loose material thereby forming a compacted surface for the remainder of the track. In one embodiment, a snowmobile driven by a continuous track passing over spaced apart front and rear track wheels and having suspension means intermediate the track wheels for maintaining the track in engagement with the terrain, the front track wheel is positioned to form a section of track inclined upwardly between the front track wheel and the suspension means in the direction of the front track wheel. In the middle of the width of the track there is provided a slide rail. The slide rail has forward and rearward parts and is connected to the suspension means to position the forward part generally parallel to the inclined section of the track as it extends longitudinally from the suspension means towards the front track wheel. Extending toward rear track wheel is the rearward part of the slide rail, and the whole rail normally is spaced apart from the track when the terrain does not engage the inclined section of the track, but the slide rail provides support to the track by urging the inclined section thereof to compact terrain contacting it and thereby provides a packed surface for the remainder of the track.

The slide rail may be formed using a continuous bar shaped to form a loop for the forward section thereof and a slotted connection for the rearward part thereof wherein the suspension means for the snowmobile may be engaged by the slide rail in a slidable manner. Both the loop and a slotted rearward connection provide for flexing of the slide rail when impact forces are experienced by the track. Further the slide rail may include two identical loops in the forward part thereof both formed from a single continuous bar and spaced laterally of each other to increase the contact area of the rail with the track over the width of the track.

REFERRING TO THE DRAWINGS

Figure 1:
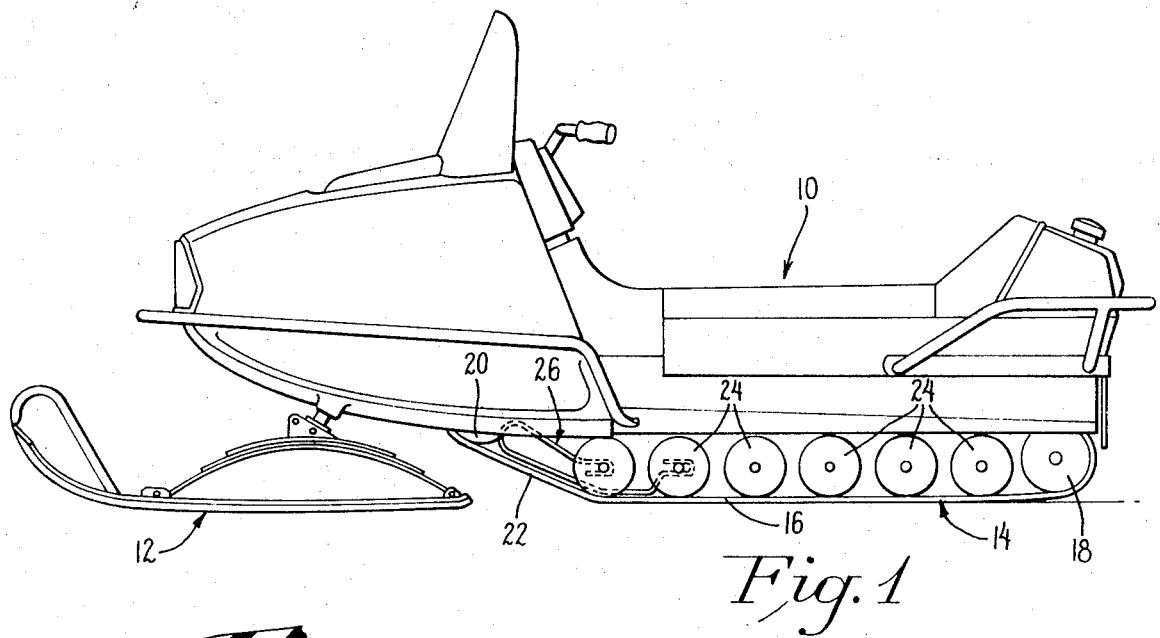
FIG. 1 is a side elevational view of a snowmobile incorporating the present slide rail thereon.

An embodiment of the slide rail will be described in detail with reference to FIGS. 1–3. In FIG. 1 a snowmobile is illustrated and indicated generally by the reference numeral 10. The vehicle is supported in the front by skis 12, and in the rear by a continuous track 14. A lower section 16 of the track 14 engages the terrain and is returned by passing over a rear track wheel 18 and subsequently a front track wheel 20. Between the front track wheel 20 and the bottom section 16 of the track 14 there is an inclined section 22 of the track 14 which initially engages any terrain above the elevation of the bottom section 16 of the track 14, such as loose terrain, before the bottom section engages the terrain and thereby passes the snowmobile 10 thereover.

The bottom section 16 of the track 14 is maintained in flat contact with the terrain by suspension means such as the bogey wheels 24 which are intermediate the front and rear track wheels 20 and 18 and connect the bottom portion 16 of the track 14 to the body of the snowmobile 10. Connected to the bogey wheels 24 is a slide rail indicated generally by the reference numeral 26.

Figure 2:
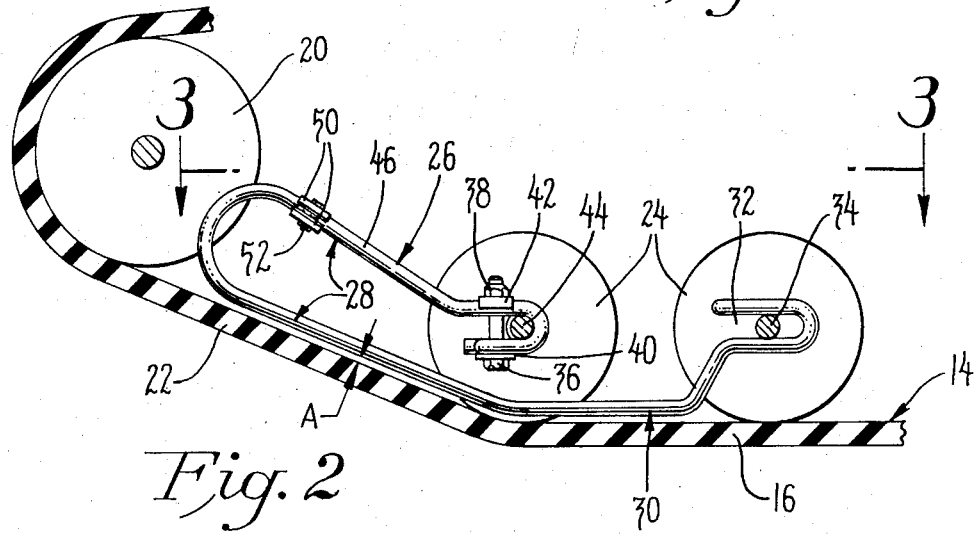
FIG. 2 is an enlarged fragmentary view of a portion of a snowmobile illustrated in FIG. 1 showing the slide rail in more detail.
Figure 3:
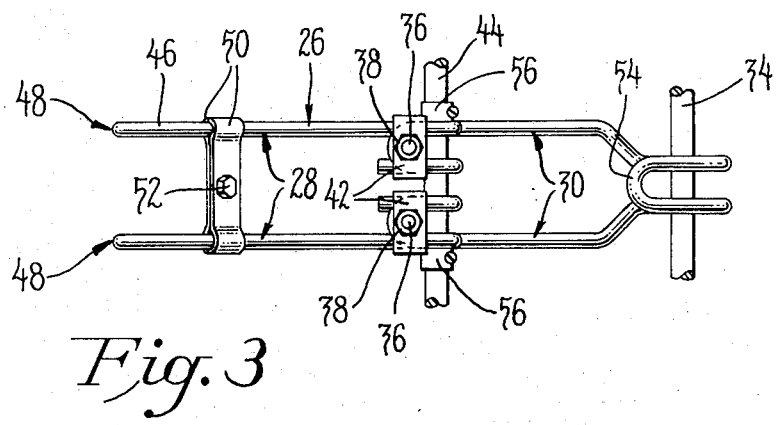
FIG. 3 is a top view of the slide rail taken along line 3—3 of FIG. 2.

The slide rail 26 is illustrated in greater detail in FIGS. 2 and 3 and when located in the center of the width of the track 14 has the advantage of preventing of the center of the track 14 from bowing in toward the vehicle. More than one slide rail 26 could be used with the plurality of slide rails 26 being spaced appropriately over the width of the track 14.

Extending longitudinally along the inclined section 22 of the track 14 is a forward portion 28 of the slide rail 26 which generally parallels the inclination of the inclined section 22 of the track 14. While the forward part 28 extends forwardly from the bogey wheels 24 toward the front track wheel 20, a rearward part 30 extends toward the rear track wheel 18. The rearward part 30 of the slide rail 26 includes means for quick removal and attachment of the slide rail 26 in the form of an open ended slot 32 which permits the slide rail 26 to be removed from the axle 34 of the bogey wheel 24 on which the rearward part 30 is supported. When the forward part 28 is formed as a loop as in the illustrated embodiment, the slot 32 provides for movement of the slide rail in the longitudinal direction to permit the loop of the forward part 28 to flex when impact force is applied to the inclined section 22 of the track 14.

The forward part 28, similar to the rearward part 30, includes means for quick removal and attachment of the slide rail 26 such as the bolt 36, nut 38, washer 40 and bracket 42 attaching the slide rail 26 to the axle 44 of the forward most bogey wheel 24. One skilled in the art will be aware of other fasteners could be used in place of the nut 38 and bolt 36. By tightening the fastener on the axle 44 the slide rail 26 is fixed in the longitudinal as well as the lateral directions. Thus, the loop of the forward part 28 is maintained in its orientation parallel to the inclined section 22 of the track 14.

There is a clearance 'A' (FIG. 2) maintained between the slide rail 26 and the track 14 under conditions when the track 14 is not engaging the terrain with the inclined section 22. Thus, when the vehicle is traveling over smooth packed terrain the slide rail 26 does not engage the track 14. The non-engagement of the track 14 with the slide rail 26 prevents frictional contact between them thereby eliminating the possibility of excessive wear and overheating of the track 14. When the inclined section 22 of the track 14 encounters loose terrain, the force of the loose terrain upon it urges it against the slide rail 26 whereupon the slide rail 26 provides support to the track inclined section 22 to compact the loose terrain and thereby provide a packed surface for the remainder or bottom section 16 of the track 14 to pass over. Large impact forces on the inclined section 22 are absorbed by the flexing of the loop of the forward part 28 of the slide rail 26 in conjunction with the sliding movement of the slot 32 on the rearward part of the slide rail 26.

Since the slide rail 26 has its forward part 28 cantilevered forwardly from the axle 44 supporting it, the rearward part of the slide rail 26 is attached to the suspension means to the rear of the connection for the forward part 28 of the slide rail 26 to thereby provide a mechanical couple to counteract the couple created when a force is applied to the forward part 28 of the slide rail 26 when rough or loose terrain is encountered.

In the embodiment illustrated the slide rail 26 is formed from a single piece of bar stock 46 which preferably is of a resilient material such as spring steel and formed by shaping the bar to the configuration illustrated. In FIG. 3, the slide rail 26 is seen to include two identical sections 48, both of which are formed by the single bar 46. The lateral spacing of the identical sections 48 is maintained by complementary clasps 50 which are clamped to the forward part 28 of the slide rail 26 by a nut and bolt fastener 52. The identical sections of the slide rail 26 increase the effectiveness of the slide rail 26 over the width of the track 14. The rearward part 30 of the identical sections 48 converge as they move towards the rear of the side rail 26 and are joined by a small segment 54 of the bar 46 after the bar 46 raps over the top of the axle 34 to provide structural rigidity to the slide rail 26.

Where additional rigidity is required in the lateral direction to keep the slide rail 26 from shifting on the forward most axle 44, axle fasteners, such as hose clamps 56, may be secured to the axle 44 on either side of the slide rail 26 as illustrated in FIG. 3.

It is to be understood that the slide rail could be used in conjunction with a slide rail suspension as well as other track vehicle suspensions. Further, a relatively rigid slide rail could be used in conjunction with resilient or spring liked means for attaching the rail to the suspension means. One skilled in the art will be aware of numerous other modifications which could be made to the concept of a slide rail for supporting the inclined section 22 of the track 14 illustrated herein.

In accordance with the provisions of the patent statues, the principle and mode of operation of the device have been explained and what is considered to represent its best embodiment has been illustrated and described. It should, however, be understood that the invention may be practiced otherwise and specifically illustrated and described without departing from its spirit or scope.

I claim:

1. In a vehicle driven by a continuous track passing over spaced apart front and rear track wheels and having suspension means intermediate the track wheels for maintaining the track in engagement with the terrain, where the front track wheel is positioned to form a section of track inclined upwardly between the front track wheel and the suspension means in the direction of the front track wheel, at least one slide rail comprising: a forward part and rearward part connected to the suspension means, said forward part generally parallel to and extending over substantially the entire length of the inclined section of track and extending longitudinally from the suspension means toward the front track wheel and said rearward part extending toward said rear track wheel, said slide rail normally spaced apart from the track but providing support to the track by urging the inclined section to compact terrain contacted thereby providing a packed surface for the remainder of the track.

2. The slide rail in claim 1 including pairs of front and rear track wheels and wherein the track is a single wide track supported on each side traverse of the length of the inclined section by the wheels, said slide rail being positioned on the middle portion of the track between the pairs of wheels.

3. The slide rail in claim 1 including means for quick removal and attachment of said slide rail with respect to said suspension means.

4. The slide rail in claim 3 wherein said quick removal and attachment means includes means for permitting flexing of said slide rail.

5. The slide rail in claim 4 wherein said means for permitting flexing of said slide rail include a longitudinally slotted member open at one end providing for longitudinal movement of said slide rail and also permitting removal of said slide rail from said suspension means through the opening.

6. The slide rail in claim 1 wherein said slide rail is a continuous bar, said bar shaped to form said forward and rearward parts.

7. The slide rail in claim 6 wherein said bar is of resilient material to permit said rail to flex.

8. The slide rail in claim 7 wherein said forward part is in the form of a loop to provide a spring action to absorb impact forces on said slide rail by flexing of said loop.

9. The slide rail according to claim 6 wherein said continuous bar further includes two identical sections spaced laterally of each other.

10. The slide rail in claim 9 wherein said identical sections are spaced closer together at the rearward parts than the forward parts and including a section of said bar interconnecting the rearward parts to provide structural rigidity to said slide rail.

11. The slide rail according to claim 1 including means for attaching said forward and rearward parts to said suspension means wherein said forward attaching means is spaced longitudinally from said rearward attaching means to compensate force couples arising from forces on said forward portion.

* * * * *